May 4, 1965  C. O. LINDGREN  3,181,623
DRILL CARRIAGES
Filed Dec. 15, 1959  5 Sheets-Sheet 2
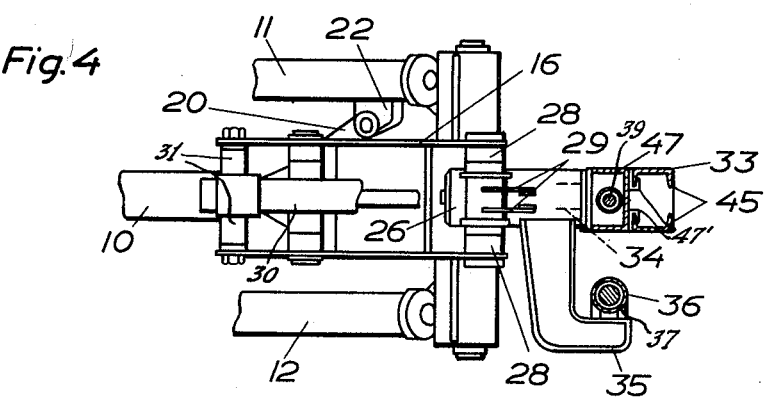
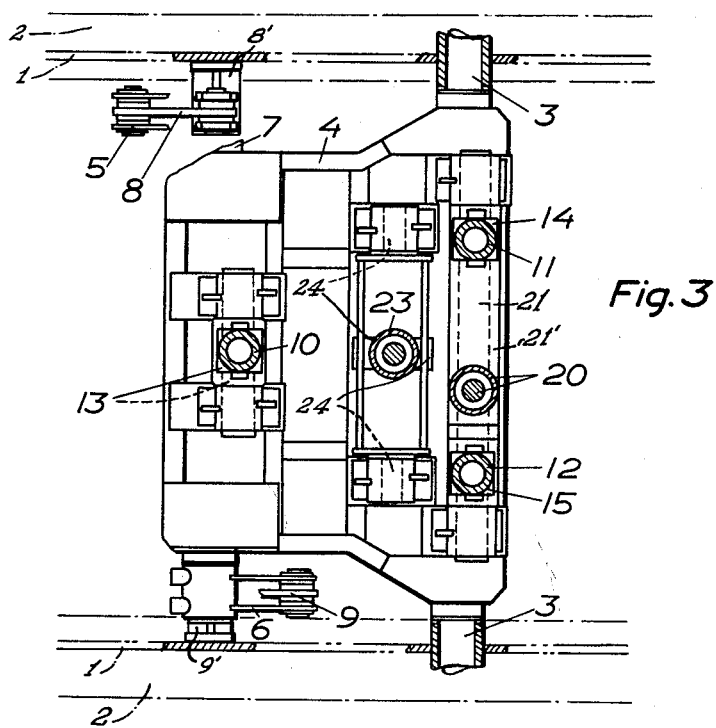
INVENTOR
Carl Olov Lindgren
BY
ATTORNEY May 4, 1965 C. O. LINDGREN 3,181,623
DRILL CARRIAGES
Filed Dec. 15, 1959 5 Sheets-Sheet 3

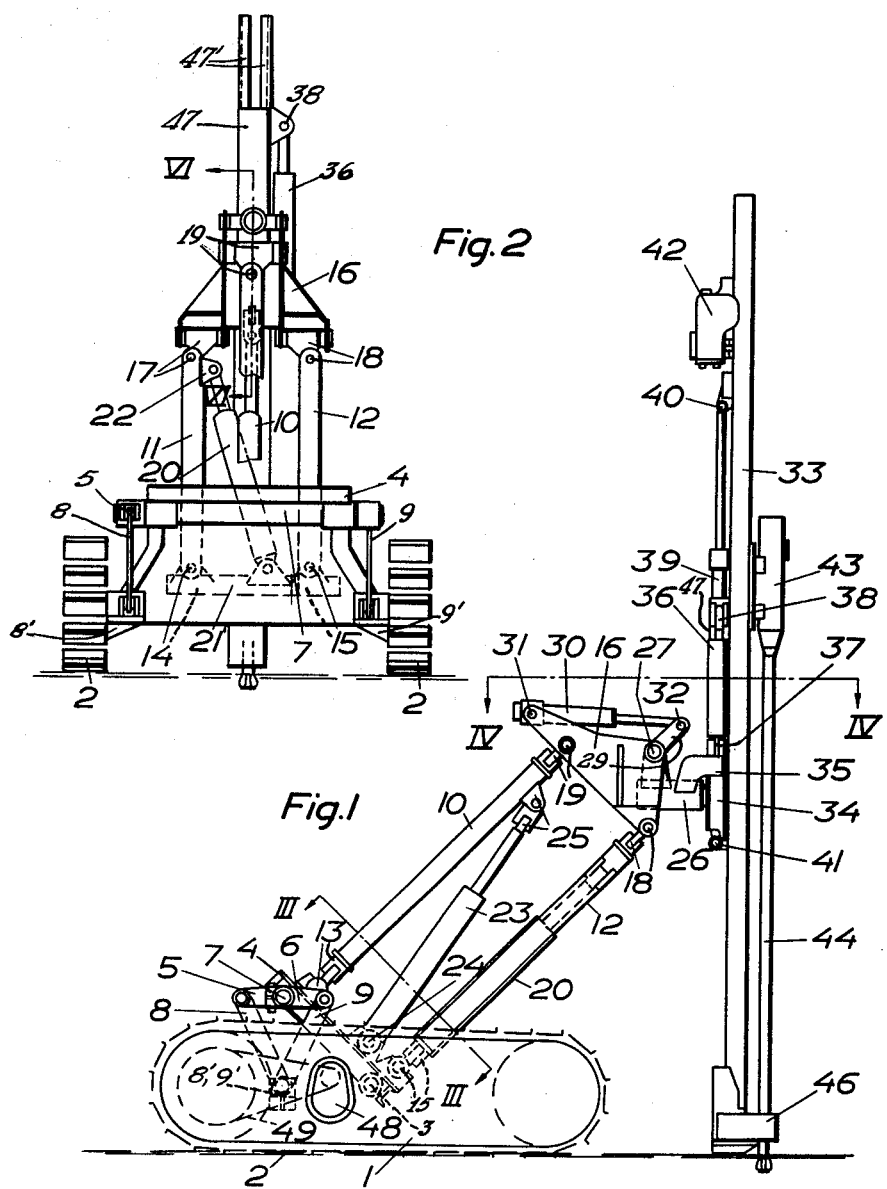

INVENTOR
Carl Olov Lindgren
BY Janis C. Marble
ATTORNEY

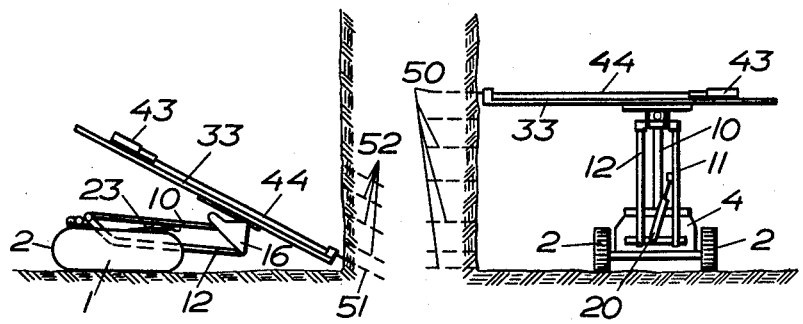
Fig.7 Fig.8
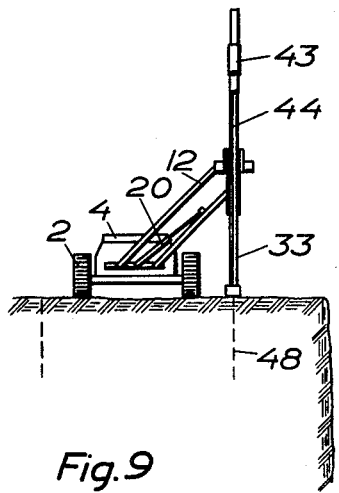 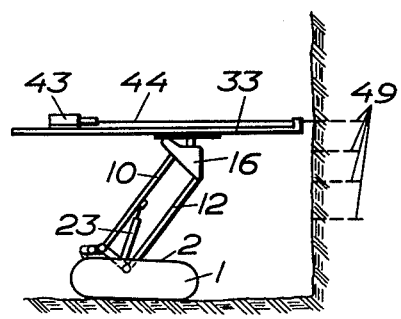
Fig.9 Fig.10

3,181,623
DRILL CARRIAGES
Carl Olov Lindgren, Nacka, Sweden, assignor to Atlas Copco Aktiebolag, Nacka, Sweden, a corporation of Sweden
Filed Dec. 15, 1959, Ser. No. 859,745
14 Claims. (Cl. 173—22)

This invention relates to drill carriages and the arrangements thereon for mounting and manipulating rock drills and rock drill feeding mechanisms or the like. One object of the invention is to provide a drill carriage mounted on endless trackways which form traction members for the carriage or on traction wheels mounted in frames, said trackways or wheels being driven through the use of fluid motors, preferably compressed air motors.

Another object of the invention is to provide a drill carriage with a mounting for a rock drill feeding mechanism which in a simple manner permits the operator to drill a group of parallel holes without having to adjust the direction of the feeding mechanism, when said mechanism is moved from one hole to another of such group.

A still further object of the invention is to provide a drill carriage in which the mounting of the feeding mechanism is very rigid and has little tendency to yield in one direction or the other under the weight of the drill and the feeding mechanism or other operating forces to which the mounting is subjected.

A still further object of the invention is to provide a drill carriage with a mounting which permits drilling of holes transversely to the longitudinal direction of the drill carriage in vertical directions as well as in horizontal directions close to the rock wall and in almost any intermediate direction.

A still further object of the invention is to provide a drill carriage which permits drilling of holes in the longitudinal direction as well as in the transverse direction of the drill carriage.

In the accompanying drawings one embodiment of a drill carriage according to the invention is illustrated by way of example which embodiment, however, is by no means limiting for the scope of the invention which may be modified in several different ways within the scope of the appended claims.

Figure 5:
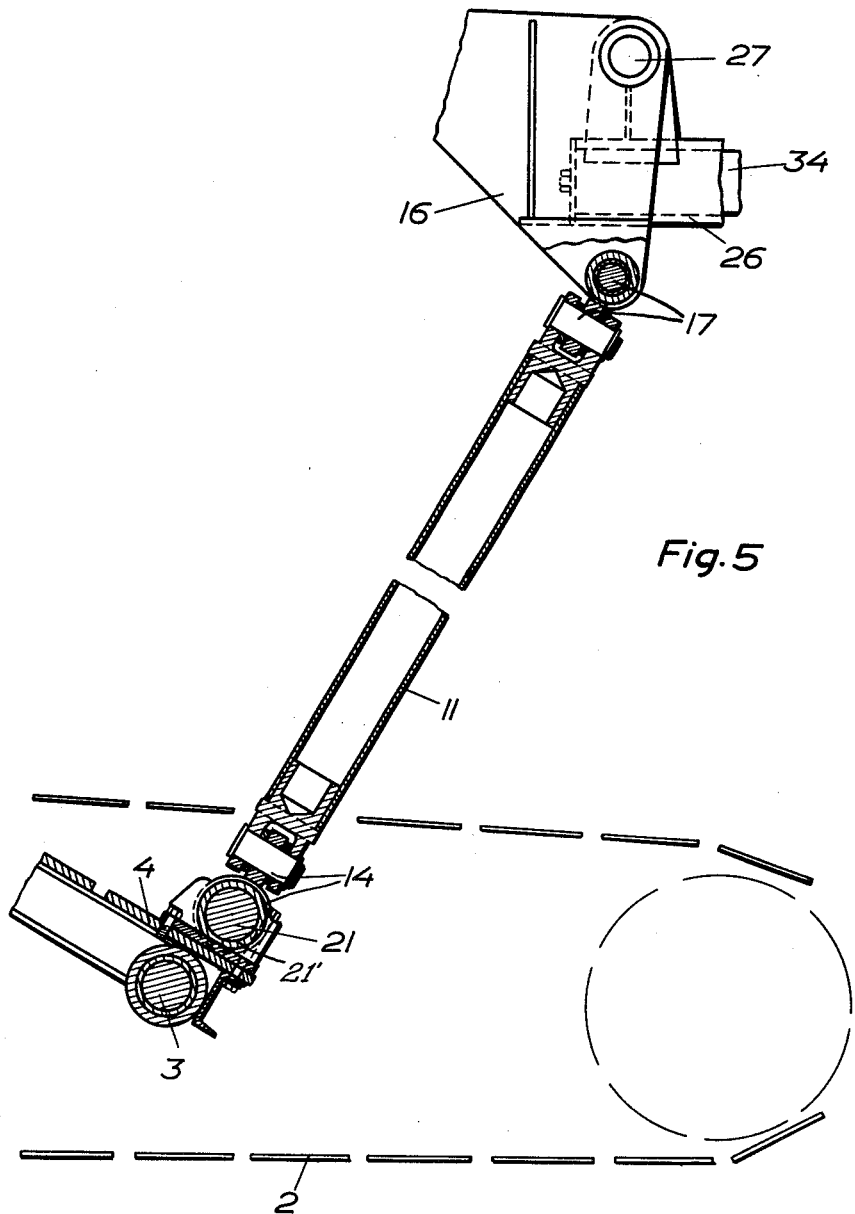
Figure 6:
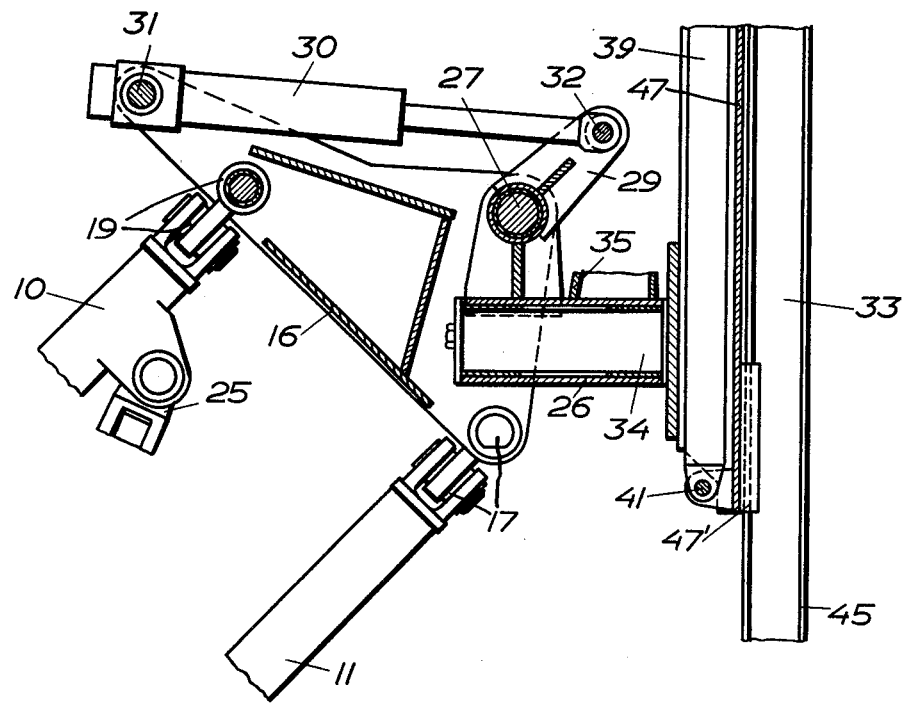

FIG. 1 is a side view of a drill carriage according to the invention, and FIG. 2 is a rear end view of the drill carriage in FIG. 1 with the upper half of the drill feed bar removed. FIG. 3 is a view partially in section on lines III—III in FIG. 1, with one corner of the transverse drill carriage frame cut away to show underlying parts and with diagrammatically indicated fragmentary horizontal sections through the frame member carrying the transverse frame, and FIG. 4 is a view partially in section on lines IV—IV in FIG. 1. FIG. 5 shows on a larger scale one of the struts carrying the drill carriage head, and FIG. 6 is a section through the drill carriage head on lines VI—VI in FIG. 2. FIG. 7 shows diagrammatically a drill carriage with the feeding mechanism in position for drilling an inclined hole close to the ground longitudinally with respect to the drill carriage. FIG. 8 shows diagrammatically the drill carriage in position for drilling horizontal holes transversely to the drill carriage. FIG. 9 shows drilling of vertical holes at one side of the drill carriage, and FIG. 10 is a side view of the drill carriage with the feed bar in position for drilling horizontal holes in the longitudinal direction of the drill carriage.

The drill carriage illustrated in the drawings consists of two elongated frame members 1 carrying endless ground engaging trackways 2, and transverse axle members 3 pivotally supported by the frame members 1 and carried by an inclined transverse frame member 4. The frame member 4 is furthermore connected to the frame members 1 by means of a pair of arms 5, 6, rigidly secured to the ends of a transverse shaft 7 rotatably mounted in the frame member 4 and pivotally connected by links 8 and 9 to brackets 8′, 9′ on the frame members 1, 1 with the points of contact of links 8 and 9 to brackets 8′ and 9′ being equidistant from axle members 3. The arms 5, 6 are directed one in the forward and one in the rearward direction of the drill carriage and form together with the shaft 7 and the links 8, 9 a means for synchronizing or equalizing the tilting movement of transverse frame 4 with respect to vertical swinging movement of the frame members 1, 1 in such a manner that when one frame member swings upwards, the other frame member will tend to swing downwards and to impart through the linkage an upward movement of substantially the same angular amount relative to the transverse frame member 4, and vice versa. The inclined transverse frame member 4 is therefore in several positions of the drill carriage kept less tilted sideways than the ground conditions would cause if both forward and rearward ends of transverse frame member 4 were rigidly connected on each side to the frame members 1, 1. Three struts, 10, 11, 12 are pivotally mounted on double pivoted joints 13, 14, 15 which are disposed in a first inclined plane on the frame member 4 and permit the struts to swing in the longitudinal direction of the drill carriage or transversely of the drill carriage or in any other intermediate direction since each of the joints has closely adjacent moving members pivoted about different axes which are substantially perpendicular, although not necessarily intersecting. The struts 10, 11, 12 are connected at their upper ends to a head member 16 by means of double pivoted joints 17, 18, 19 disposed in a second inclined plane parallel to said first plane so that the head member 16 when the struts are tilted or raised in one direction or the other, is moved substantially parallel to the inclined traneverse frame member 4 because of the double pivoting action of joints 13–19 and the parallel disposition of struts 10–12 in a manner, in the illustrated embodiment, such that the three struts are positioned on both transverse frame member 4 and head member 16 to define a triangle. A power cylinder 20 is pivotally connected to a bushing 21′ pivotally arranged on the shaft 21 mounted on the frame member 4 and at 22 to the strut 11, the shaft 21 also forming one of the pivots of the universal joints 14 and 15.

A second power cylinder 23 is pivotally connected by a double pivoted joint at 24 to the frame member 4 and by a second double pivoted joint at 25 to the strut 10. The power cylinders 20 and 23 are double acting pressure fluid cylinders which permit power swinging of the struts 10, 11, 12 transversely and longitudinally, respectively, of the drill carriage.

A bracket 26 is mounted to swing on a shaft 27 extending transversely of the head member 16, FIG. 6, and mounted in bearings 28 carried by said head member. The bracket 26 has arms 29 rigidly secured to the bracket for swinging the same by means of a power cylinder 30 pivotally connected at 31 to the head member 16 and at 32 to the arms 29. The power cylinder 30 is a double acting pressure fluid cylinder which permits swinging of the brackets 26 in a longitudinal vertical plane of the drill carriage from horizontal to vertical position and vice versa, i.e. from the position to FIGS. 1 and 2 to the position in FIG. 10 and vice versa. A drill feed bar 33 in the form of an elongated sash incorporating spaced apart parallel channel bars having their flanges aligned and facing each other, which in FIG. 1 is illustrated in a vertical position, is slidably mounted with the one pair of their opposite flanges guided by channel pieces 47' on a guide member 47. The guide member 47 is carried on a trunnion 34 extending transversely thereto and to the feed bar adjacent the middle portion of the feed bar and mounted for turning in the bracket 26. For this purpose the bracket 26 is provided with an arm 35 and a power cylinder 36 is pivotally connected to the arm 35 at 37 and to the guide member 47 at 38 and said power cylinder is double acting and serves to swing the guide member 47 together with the feed bar 33 on the trunnion 34 from a direction longitudinally of the drill carriage to transverse direction and vice versa. A power cylinder 39 is connected to a bracket on the feed bar 33 at 40 and to the guide member 47 at 41 and serves to move the feed bar 33 longitudinally of itself relatively to said guide member 47 and said trunnion 34. 42 indicates diagrammatically a drill feed motor which over a chain or other flexible member (not shown) serves to feed a drill 43 with a drill steel 44 towards a rock face. The drill 43 is guided for reciprocation by the other pair 45 of the opposite flanges provided on the feed bar 33 which also carries a drill steel guide 46. The details of the drill, the feed bar, the feed motor and the drill steel guide are not illustrated in detail since they may be carried out in any conventional manner well known to those familiar with the art.

The drill carriage is moved on the ground by means of two pneumatic traction motors 48 built into the frames 1, 1 and arranged to drive the trackways over suitable chain and sprocket transmissions 49.

The pressure fluid for operation of the different power cylinders, the motors and the drill of the illustrated drill carriage is supplied from suitable sources not illustrated, and the various hoses for conveying pressure fluid have been omitted since they would make the drawings rather congested and since the provision of such hoses or conduits is obvious to those skilled in the art.

In FIGS. 1 and 2 the drill carriage according to the invention is illustrated in position for drilling vertical holes. It is obvious that swinging of the struts 10, 11, 12 to the left or to the right in FIG. 1 by means of the power cylinder 23 moves the drill steel 44 parallel to itself in a vertical longitudinal plane through the drill carriage. This enables the operator to drill a group of holes in such a plane which are parallel without changing the setting of the drill steel. The operator can do this by simply manipulating the power cylinder 23 and raising or lowering the drill feed bar 33 by means of the power cylinder 39.

When it is desired to drill a number of vertical parallel holes along a surface transversely of the drill carriage the operator manipulates the power cylinder 20 and the power cylinder 39 causing the drill steel to move transversely of the drill carriage substantially along an arcuate cylindrical surface. The operator may also drill holes 53 along one side of the drill carriage as illustrated in FIG. 9. The drill carriage is then moved from hole to hole, for instance along a bench.

By operation of the power cylinder 30 the operator may swing the drill feed bar 33 from the illustrated vertical position to horizontal position and directed longitudinally of the drill carriage as illustrated in FIG. 10 for drilling parallel holes 54.

If the operator in the position of FIG. 1 manipulates the power cylinder 36, the operator may swing the drill feed bar 33 on the trunnion 34 from the illustrated vertical position to a horizontal position with the drill steel 44 directed transversely of the drill carriage as illustrated in FIG. 8. By operating the power cylinder 36 only the operator may drill groups of holes in a fan shaped arrangement. With the feed bar in the position of FIG. 8 the operator may drill groups of parallel horizontal holes 50 transversely to the drill carriage from close to the ground to a high elevated position. These holes will be arranged along a cylindrical surface. Due to the inclination of the planes of the pivots 13, 14, 15 and 17, 18, 19 it is possible to swing the struts 10, 11, 12 down to a position in which the drill 43 may be operated very close to the ground. When drilling transversely to the drill carriage the drill may be positioned to move horizontally close to the ground. When drilling longitudinally of the carriage the feed bar may be dumped to the position of FIG. 7 for drilling close to the ground as at 51 or inclined holes 52, FIG. 7.

It is obvious that due to the arrangement of the three struts 10, 11, 12 the head member 16 is always kept very steadily in the various positions of adjustment.

The drill carriage above described and illustrated in the drawings should only be considered as an example and the invention may be modified in several different ways within the scope of the following claims.

What I claim is:

1. A drill carriage comprising a transverse frame member, two elongated frame members pivotally mounted to swing on transverse axles disposed on the rearward half of said frames, one elongated frame member and axle at each side of said transverse frame member at the forward end thereof, ground engaging means on said elongated frame members for carrying the drill carriage on the ground, means for driving said ground engaging means, a transverse shaft in the transverse frame member offset to said axles of said elongated frame members horizontally as well as vertically for supporting said transverse frame member in inclined relationship with respect to said elongated frame members at the rear portions thereof, one arm directed in one direction and a second arm directed in the opposite direction longitudinally of the drill carriage on said transverse shaft, means for connecting said arms pivotally to said elongated frame members, a drill feeding mechanism and means on said transverse frame member for adjustably supporting said drill feeding mechanism.

2. In self-propelled pneumatic rock drill carriage and supporting apparatus of the character described for carrying and supporting a rock drill selectively in a plurality of operative positions both horizontally and vertically and both longitudinally and transversely with respect to said self-propelled apparatus, the combination which comprises a self-propelled carriage for said apparatus, a frame and means for suspending said frame horizontally and transversely in said carriage for tilting movement with respect thereto and for carrying said drill and supporting apparatus therefor, a movable head member for supporting said drill and spaced above said transverse frame in said carriage and substantially parallel thereto, at least three parallel strut members movably interconnecting said head member and said transverse frame for supporting said movable head member in a plurality of positions with respect to said transverse frame, double-pivoted joint means at each end of each said strut interconnecting opposite ends of said struts respectively to said transverse frame member and said movable head member, each said joint means including closely adjacent movable members pivoted about two substantially perpendicular axes whereby substantially universal movement of said head member is achieved in both vertical and horizontal directions both longitudinally and transversely of said carriage while maintaining parallelism between said movable head member and said transverse frame and among said struts, hydraulic means for effecting said movements of said head member with respect to said transverse frame in all said plurality of directions, drill guide means for supporting and guiding said drill, means for pivotally mounting said drill guide means on said head member for tilting and pivoting movement with respect thereto in two substantially perpendicular planes, and actuating means on said head member and said drill guide means for individually effecting said tilting and pivoting movements.

3. Apparatus as recited in claim 2 in which said hydraulic means for effecting said movements of said head member includes first double acting hydraulic cylinder-and-piston means for swinging said movable head member and said struts transversely of said apparatus and second double acting hydraulic cylinder-and-piston means for swinging said movable head member and said struts longitudinally of said carriage.

4. Apparatus as recited in claim 3 in which each of said cylinder-and-piston means is operatively connected between said transverse frame and a different one of said struts, and in which said first cylinder-and-piston means for swinging said head member transversely is in substantially the same transverse plane as the one of said struts to which it is connected, while said second cylinder-and-piston means for swinging said head member longitudinally is in substantially the same longitudinal plane as the one of said struts to which it is connected.

5. Apparatus as recited in claim 2 in which said means for pivotally mounting said drill guide means on said movable head member for tilting and pivoting movement includes pivot means effecting pivoting of said guide means with respect to said head member through one plane, and means for tilting said pivot means about an axis perpendicular to the pivot axis of said pivot means for tilting movement of said drill guide means through a substantially perpendicular plane.

6. Apparatus as recited in claim 5 which also includes, as actuating means for said pivoting and tilting movements, hydraulic cylinder-and-piston means on said head member for tilting said pivot means and said drill guide means, and separate hydraulic cylinder-and-piston means operatively connected between said drill guide means and said head member for pivoting said drill guide means about the axis of said pivot means.

7. Self-propelled pneumatic rock drill carriage apparatus of the character described for carrying and supporting a rock drill thereon, which comprises in combination two elongated carriage members on opposite sides of said apparatus and including endless track means for supporting and propelling said apparatus, a transverse frame member between said carriage members for supporting said rock drill, means for pivotally mounting one end of said transverse frame member on and between said carriage members, a transverse shaft extending across said carriage adjacent the opposite end of said transverse frame member and rotably mounted with respect thereto, said shaft being spaced a substantial distance both horizontally and vertically from said pivot mounting means, a crank arm affixed at each opposite end of said shaft with said arms extending from said shaft in opposite directions longitudinally of said carriage apparatus, linkage means for connecting said crank arms pivotally to said carriage members at points spaced substantially below said shaft whereby upward movement of one of said carriage members with respect to the other imparts through said linkage and said shaft an equalizing upward movement to the opposite side of said transverse frame member, and means on said transverse frame member for adjustably supporting said rock drill thereon.

8. Drill carriage apparatus as recited in claim 7 in which said points of pivotal connection of said linkage means to said carriage members are substantially equidistant from the axis of said pivotal mounting means connecting the opposite end of said transverse frame member to said carriage members.

9. Drill carriage apparatus as recited in claim 7 in which said transverse shaft is parallel to the axis of said pivotal mounting means for the opposite end of said transverse frame members and at the end thereof furthest removed from said rock drill.

10. Drill carriage apparatus as recited in claim 7 in which said transverse frame member is inclined longitudinally of said carriage with the rearward end thereof spaced a substantial distance above said pivotal mounting means and substantially at the axis of said transverse shaft.

11. In self-propelled pneumatic rock drill carriage and supporting apparatus of the character described for carrying and supporting a rock drill selectively in a plurality of operative positions both horizontally and vertically and both longitudinally and transversely with respect to said self-propelled apparatus, the combination which comprises a self-propelled carriage for said apparatus, a transverse frame and means for pivotally suspending said transverse frame in said carriage for tilting movement with respect thereto and for carrying said drill and supporting apparatus therefor, said means for suspending said frame in said carriage for tilting movement with respect thereto including axles at each side of the forward end of said transverse frame for pivotally mounting said forward end of said frame across said carriage, a shaft rotatably mounted across the rearward end of said transverse frame, said shaft being spaced a substantial amount both vertically and horizontally from said forward end of said frame in said carriage, a rearwardly extending lever arm affixed to one end of said shaft at one side of said transverse frame, a forwardly extending lever arm affixed to the opposite end of said shaft at the opposite side of said frame, and link means connecting the rearward end of said rearwardly extending lever arm and the forward end of said forwardly extending lever arm pivotally to said carriage, the points of connection of said link means to said carriage being below said shaft and substantially equidistant from said axle members longitudinally of said carriage effecting equalization of tilting movements between said rearward end of said transverse frame member and each opposite side of said carriage when the opposite sides of said carriage are at unequal different levels, a movable head member for supporting said drill and spaced above said transverse frame in said carriage and substantially parallel thereto, at least three parallel strut members movably interconnecting said head member and said transverse frame for supporting said movable head member in a plurality of positions with respect to said transverse frame, double-pivoted joint means at each end of each said strut interconnecting opposite ends of said struts respectively to said transverse frame member and said movable head member, each said joint means including closely adjacent movable members pivoted about two substantially perpendicular axes whereby substantially universal movement of said head member is achieved in both vertical and horizontal directions both longitudinally and transversely of said carriage while maintaining parallelism between said movable head member and said transverse frame and said struts, hydraulic means for effecting said movements of said head member with respect to said transverse frame in all said plurality of directions, drill guide means for supporting and guiding said drill guide, means for pivotally mounting said drill guide means on said head member for tilting and pivoting movement with respect thereto in two substantially perpendicular planes, and actuating means on said head member and said drill guide means for individually effecting said tilting and pivoting movements.

12. Drill carriage apparatus as recited in claim 11 in which said transverse frame is inclined in said carriage and longitudinally thereof with the rearward end of said transverse frame raised to substantially the axis of said shaft.

13. In self-propelled pneumatic rock drill carriage and supporting apparatus of the character described for carrying and supporting a rock drill selectively in a plurality of operative positions both horizontally and vertically and both longitudinally and transversely with respect to said self-propelled apparatus, the combination which comprises a self-propelled carriage for said apparatus, a transverse frame and means for pivotally suspending said transverse frame in said carriage for tilting movement with respect thereto and for carrying said drill and supporting apparatus therefor, a movable head member for supporting said drill and spaced above said transverse frame in said carriage and substantially parallel thereto, three parallel struts all substantially the same length and arranged between said transverse frame member and said movable head member so as to define in cross-section a triangle and movably interconnecting said head member and said transverse frame for supporting said movable head member in a plurality of positions with respect to said transverse frame, double-pivoted joint means at each end of each said strut interconnecting opposite ends of said struts respectively to said transverse frame and said movable head member, each said joint means including closely adjacent movable members pivoted about two substantially perpendicular axes with one of said two axes of each of said double-pivoted joint means at each end of each of said strut members being parallel to said transverse frame member and said movable head member and one axis of each of the other of said double-pivoted joint means whereby substantially universal movement of said head member is achieved in both horizontal and vertical directions both longitudinally and transversely of said carriage while maintaining parallelism between said movable head member and said transverse frame and among said struts, hydraulic means for effecting said movements of said head member with respect to said transverse frame in all said plurality of directions, drill guide means for supporting and guiding said drill, means for pivotally mounting said drill guide means on said head member for tilting and pivoting movement with respect thereto in two substantially perpendicular planes, and actuating means on said head member and said drill guide means for individually effecting said tilting and pivoting movements.

14. Apparatus as recited in claim 13 in which said double-pivoted joint means at said transverse frame and said movable head member are disposed in parallel transverse planes inclined at an angle with respect to the longitudinal axis of said carriage.

References Cited by the Examiner
UNITED STATES PATENTS

| | | | |
|---|---|---|---|
| 1,442,552 | 1/23 | Wickersham | 180—9.54 |
| 2,534,772 | 12/50 | Howard | 180—9.5 |
| 2,703,222 | 3/55 | Feucht | 173—43 |
| 2,828,137 | 3/58 | Wagner | 180—9.5 |
| 2,845,251 | 7/58 | Barton et al. | 173—27 |
| 2,879,034 | 3/59 | Cowan | 173—31 |
| 2,996,305 | 8/61 | Breveglieri et al. | 208—6 |
| 3,030,713 | 4/62 | Hendrickson et al. | 173—43 |

BROUGHTON G. DURHAM, *Primary Examiner.*

BENJAMIN BENDETT, CHARLES E. O'CONNELL, *Examiners.*